May 28, 1963  C. C. CRAIG  3,091,168
FILM HOLDER
Filed Oct. 9, 1959  3 Sheets-Sheet 1

INVENTOR.
CARROLL C. CRAIG
BY Fulwider Mattingly Huntley
Attorneys

INVENTOR.
CARROLL C. CRAIG
BY Fulwider Mattingly & Huntley
Attorneys

May 28, 1963  C. C. CRAIG  3,091,168
FILM HOLDER
Filed Oct. 9, 1959  3 Sheets-Sheet 3

INVENTOR.
CARROLL C. CRAIG

United States Patent Office 3,091,168
Patented May 28, 1963

3,091,168
FILM HOLDER
Carroll C. Craig, 1614 Victory Blvd., Glendale 1, Calif.
Filed Oct. 9, 1959, Ser. No. 845,375
12 Claims. (Cl. 95—66)

My invention relates generally to film holders and more particularly to an improved film holder of the type adapted to receive cut film for use in a camera.

For many years, almost all cameras that did not use roll film have used a photo sensitive material in the form of a plate or cut film, that is mounted in a film holder which may be removably held in the focal plane of the camera. These holders are normally formed with a partition or septum which has a frame around it which is used to hold a piece of cut film on each side of the partition, and also to allow removable dark slides to be inserted in front of the film in order to protect the film from light.

Heretofore, film holders have usually been made of wood or plastic, since these materials possess considerable dimensional stability and may be relatively easily worked in order to produce film holders without excessive manufacturing cost. However, as the cameras themselves have been more precisely and accurately made, a demand has arisen for a more precisely fabricated film holder that can be manufactured at a moderate cost. A major disadvantage of the prior film holders is that they are so designed that the components of the exterior frame which forms the septa supporting means were formed of such shape that numerous extensive, laborious, and costly milling and machining operations were necessary to produce them. Further, these frame components were normally designed to be attached together by rivets, screws or other such means which require time consuming and costly drilling and related operations.

The prior film holders also have the disadvantage that the major portion of the frame members, e.g., the side and end frame members are mounted around the septum outside the periphery of the edges of the septum. Examples of such holders are shown in patent Nos. 1,641,420 and 2,522,347. With such construction, the corner locations at which the different members of the frame are attached together also lie outside the edges of the septum, and the septum adds very little strength and rigidity to the frame. Therefore, the frame must be of relatively heavy construction to attempt to overcome the inherent weakness at the corner joints to loads which tend to twist the frame.

Bearing in mind the above mentioned difficulties encountered in photographic film holders, it is a major object of my invention to provide an improved film holder for photographic films.

Another object of my invention is to provide a film holder which may be partially formed of material such as plastic to thereby take advantage of the properties of such materials.

It is a further object of my invention to provide a film holder that may be thinner and of a lighter weight than previously available holders while still retaining the necessary strength and rigidity.

Still another object of my invention is to provide a film holder having a novel and improved means for preventing the admission of unwanted light to the film.

It is a still further object of my invention to provide a film holder which permits the use of injection-molded material, such as high-impact plastic for producing certain parts, whereby said parts can be made automatically at low cost with molds on modern machinery which is presently available.

Another object of my invention is to provide a film holder, the various componets of which are designed and constructed for fabrication by modern mass production means so that the individual parts may be inexpensively produced and these parts may be assembled by an operator having comparatively little skill.

It is the further object of the invention to provide a film holder comprising a relatively rigid panel having mounted thereon a plurality of members which cooperate to form a film and dark slide holding frame within the perimeter of the edges of the panel whereby the rigidity and strength of the panel is transferred to the frame.

These and other objects of my invention will become apparent from the following description of the preferred embodiments thereof in conjunction with the attached drawings, in which:

FIGURE 5 is a fragmentary view of a section of the lower end of the film holder, taken along line 5—5 in FIGURE 1;

FIGURE 6 is a fragmentary view of a section of the upper end of the holder, taken along line 6—6 in FIGURE 1;

FIGURE 7 is a perspective view of the second form of my invention wherein the lower and upper transverse members are injected molded directly on the septum;

FIGURE 8 is a longitudinal cross sectional view, taken along line 8—8 in FIGURE 7;

FIGURE 9 is a fragmentary cross sectional view of the upper transverse member of the film holder, taken along line 9—9 in FIGURE 7;

FIGURE 10 is a perspective view of the guide portion of the side frame means to be used with the second embodiment of my invention, shown in FIGURE 7;

FIGURE 11 is a view of the guide portion shown in FIGURE 10, as seen along the arrow 11;

FIGURE 12 is a longitudinal cross sectional view, taken along line 12—12 in FIGURE 10;

FIGURE 13 is a cross sectional view, taken along line 13—13 in FIGURE 11, showing how the guide portion cooperates with the septum;

FIGURE 14 is a cross sectional view, taken along line 14—14 in FIGURE 11, illustrating the manner in which the septum intermeshes with the guide portion;

FIGURE 15 is a cross sectional view showing the way that the guide portion fits together with the septum along line 15—15 in FIGURE 11; and FIGURE 16 is a cross sectional view, taken along line 16—16 in FIGURE 11, illustrating the manner in which the guide portion cooperates with the septum at that portion.

Figures 1, 2:
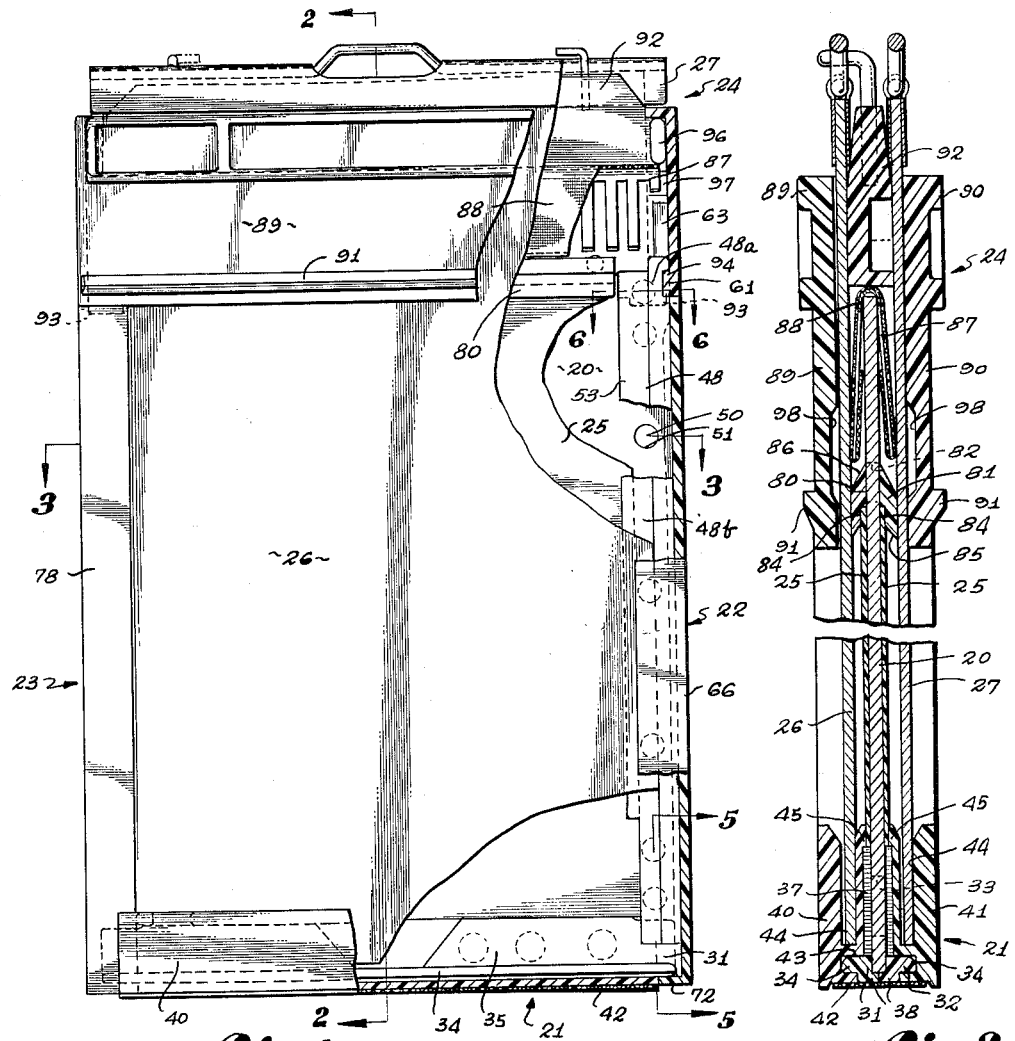
FIGURE 1 is a partially cut away front elevational view of one preferred form of my film holder incorporating my invention.
FIGURE 2 is a longitudinal cross sectional view to a larger scale, taken along line 2—2 in FIGURE 1.

It has been found that much confusion arises in describing film holders. Therefore, in order to simplify the description of my invention, I shall describe and claim the holder as it would appear when standing on end on a horizontal surface with a broad face towards the viewer and the slide entry end up, such as shown in FIGURE 1. The terms "forward" and "front" refer to the direction towards the viewer, and items which are located forward of the septum. "Rear," "back," and "rearward" refer to the direction away from the viewer and items located to the rear of the septum. Since the long side of the film holder extends vertically, the term "transverse" is practically synonymous with horizontal. In order to refer to something which is located towards the center of the septum from the side edges thereof, the term "in" or "inward" will be used; while the terms "out, outside," and "outwardly" will be used to refer to something which is away from the center of the holder. "Above," "up," "upper," and "top" will be used to describe items which are located towards the slide entry end of the holder while the terms "below," "down," "lower," and "bottom" will be used to describe items which are towards the end opposite the slide entry end.

Referring now to the drawings and particularly to FIGURES 1 through 6, a septum 20 forms the backbone of my holder. This septum is preferably made of a rectangular sheet of a material such as aluminum, in order to provide a light weight rigid panel member to which the other components of the holder may be mounted. As seen in FIGURES 1 and 2, the sptum 20 has front and rear faces, as well as top, bottom, and side edges. Bottom frame means 21, right side frame means 22, left side frame means 23, and top frame means 24 are mounted to the septum 20 in a manner which will be described in more detail below. These frame means cooperate with the septum 20 to removably hold a piece of film 25 on either face of the septum 20 and provide guides to removably hold front and rear dark slides 26 and 27, respectively, over the film to protect it from light. The dark slides 26 and 27 are conventional and are preferably made of some easily machinable, opaque material, such as fiber board.

As can be seen in the different figures, the septum 20 is provided with a series of apertures or bores therethrough. In the embodiments of my invention shown herein, the apertures are formed by drilling or punching round holes through the septum adjacent to but spaced inwardly of the different edges. However, it is to be understood that while the holes shown are preferred, the spirit of my invention does not require that the apertures be round or that the apertures be completely surrounded by the septum. For example, the apertures could be formed with a rectangular punch. An example of the latter situation is where an aperture is located so that an outside portion of it actually extends through an edge of the septum.

Figure 4:
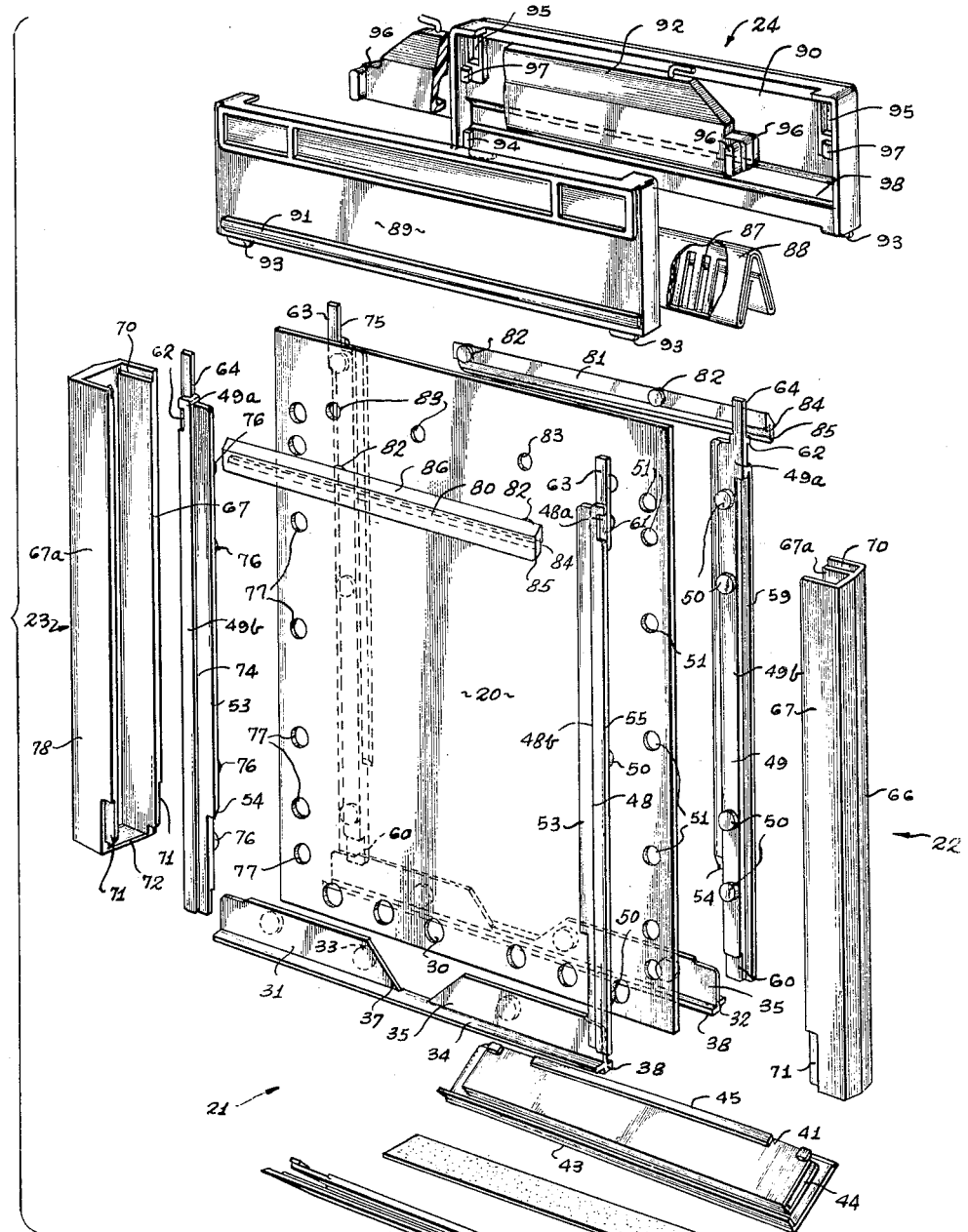
FIGURE 4 is an exploded pictorial view of the holder shown in FIGURE 1 and illustrates different components more clearly.

Referring now to FIGURE 4 in particular, a series of apertures 30 are provided adjacent to the lower edge of the septum 20. Extending across the lower edge of the septum is a lower transverse member which comprises front and rear lower transverse member portions 31 and 32, respectively. The member portions 31 and 32 are connected together and to the septum 20 by means of a series of integrally formed bosses or pin portions 33 each of which is integrally formed on one of the transverse member portions and is cemented, or otherwise attached, to the other of the transverse member portions.

In the embodiment shown, the bosses 33 project a distance equal to the thickness of the septum 20. However, the bosses could extend further and fit into recesses provided at the proper positions on the opposite transverse member portion. Smiliarly, it is within the scope of my invention, to provide bosses on both transverse member portions to extend part way through each aperture 30, the opposed ends of the bosses being cemented together.

The transverse member portions 31 and 32 each have a projecting transverse rib, such as rib 34, and an upwardly extending flange, such as flange 35. As can be seen in FIGURES 1 and 2, the lower edge of the film 25 fits against the upper edge of the flange 35 and therefore a V-shaped notch 37 is provided in flange 35 in order that the fingers of the operator may more easily grasp the film. The upwardly extending flange on portion 32 is similarly shaped.

It should be noted that each of the transverse member portions 31 and 32 has a lip 38 which extends at least partially across the thickness of the bottom edge of a septum 20 to the other transverse member portion so that the lower edge of the septum is covered. With this construction, front and rear loading flaps 40 and 41, respectively, may be hingedly mounted to the holder by means of a cloth hinge 42 which is cemented or glued to the lips 38.

Each of the loading flaps 40 and 41 is provided with a transverse rib-receiving groove 43 which receives the projecting transverse ribs 34 on the transverse member in order to prevent any possibility that light may be transmitted through the crack between the respective transverse member portions and loading flaps. Along their respective upper edges, the loading flaps 40 and 41 are provided with upwardly facing dark slide-receiving slots 44 in order to receive the bottom of the dark slides 26 and 27. With this arrangement, the loading flaps 40 and 41 may be held in the upward closed position shown in FIGURES 1 and 2 by the dark slides 26 and 27, when the latter are fully inserted. It should also be noted that each of the hinged loading flaps 40 and 41 is provided with a foot 45, that is parallel to and spaced from the septum 20, to hold the lower edge of the film 25 against the septum and prevent any possibility that the film may slip out of position.

Having described the bottom frame means, I will now turn my attention to the side frame means 22 and 23. Each of the side frame means comprises a guide portion to removably hold the film and dark slides in place, and has interlocking means located above the guide portion by which the top frame means 24 may be securely attached to the septum. In the first embodiment of the invention, each of the side frame means is formed of front and rear guide rails mounted to the septum 20 with a channel member mounted to the guide rails, and, as will be seen, the interlocking means is formed by the top portions of the channel members and guide rails while the guide portion is formed of the parts of the guide rails and channel members below the interlocking means.

Figure 3:
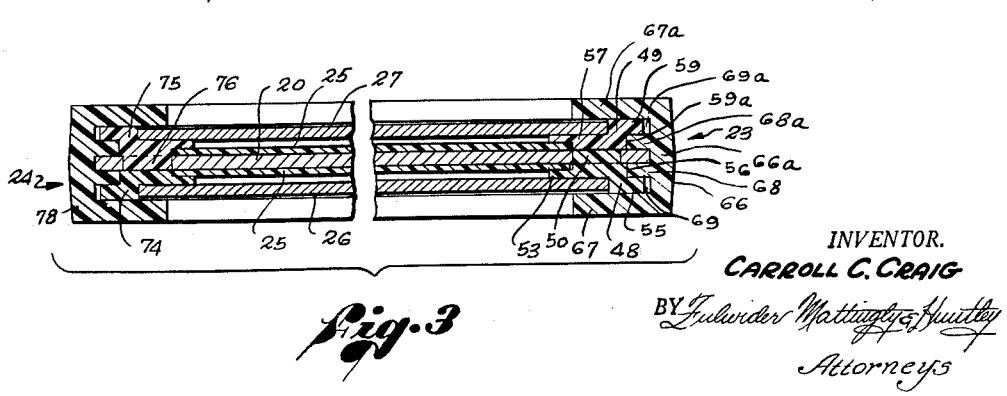
FIGURE 3 is a cross sectional view taken transversely across the center of the holder along line 3—3 in FIGURE 1, but to a larger scale.

Referring now to FIGURE 4, the right side frame means 22 includes a right front and a right rear guide rail 48 and 49, respectively, which are mounted to opposite faces of the septum 20 and to each other by means of a series of integrally formed bosses 50 which extend through the series of apertures 51 in the septum 20 similar to the way that the lower transverse portions 31 and 32 are mounted to the septum. The guide rails 48 and 49 have locking portions 48a and 49a at their generally upper ends, respectively, and guide portions 48b and 49b, respectively, below the locking portions. The cross section of the guide portions of guide rails 48 and 49 is best shown in FIGURE 3, wherein it can be seen that the guide rail 48 has a lip 53 which has been relieved on its septum side in order to form with septum 20 a film receiving recess for holding the film 25. The inside surface of the lip 53 is tapered outwardly at its lower end 54 in order that the film may be inserted into the film receiving recess more easily. Located at the outer edge of the guide rail portion 48 is an outer flange 55 which extends outwardly and is displaced forwardly of the septum whereby an outer recess 56 is formed. It should be noted that the outer edge of the outer flange 55 terminates a small distance inside or inward of the right edge of the septum 20. Similarly, the right rear guide rail 49 has a lip 57 which has been relieved on its septum side to form a film receiving recess and has an outer flange 59 displaced rearwardly of the septum 20 forming a recess 59a therebetween.

At the ir lower ends, the septum faces of the guide rail portions 48 and 49 have been relieved to form relieved portions 60, see FIGURE 4, in order that they may fit over the end portion of the upwardly extending flanges on the lower transverse member portions 31 and 32. Thereby, the lower transverse member portions and the guide rails may be cemented together to make the film holder very light tight at the lower corners. It should be noted that the side frame means does not depend on this cemented joint to hold it in place, since the guide rails are integrally mounted by the bosses 50 as mentioned above.

The guide rails 48 and 49 are also similar at their respective locking portions 48a and 49a, respectively, in that each is provided with an outwardly facing recess or notch 61 and 62, respectively, each of which is located just below an upstanding portion 63 and 64, respectively, at the upper end of the particular guide rail. The recesses 61 and 62 each cooperate with portions of the top frame means 24 to lock the top frame means to the side frame means 22 as will be described below.

Located around the guide rails 48 and 49 is a right side channel member 66 which has front and rear outer side walls 67 and 67a, respectively, extending inwardly from its web 66a. As can best be seen in FIGURE 3, the side walls 67 and 67a cooperate with the guide rails 48 and 49 to provide recesses to removably hold the dark slides 26 and 27 in their position over the film, as desired. The channel member 66 is also provided with front and rear inner ribs 68 and 68a, respectively, which are spaced apart a distance substantially equal to the thickness of the septum 20 and have a thickness substantially equal to the respective outer recesses into which they fit.

It should be noted that the projection of the ribs 68 and 68a from the inner surface of the web 66a is coordinated with the depth of the outer recesses 56 and 59a around the edge of the septum 20 so that voids 69 and 69a remain after assembly. Plastic solvent or cement is placed on the faces of the inner ribs 68 and 68a and the inner surfaces of the side walls 67 and 67a in order to hold the channel member 66 on the guide rails. Therefore, the voids 69 and 69a are provided to receive any excess glue which might otherwise be forced into the dark slide receiving recesses.

Referring now to the upper end of the channel member 66, the inner surfaces of the side walls 67 and 67a of the channel member are recessed at their upper ends as indicated by the numeral 70 on wall 67a. The recesses cooperate with portions of the top frame means 24 to more rigidly interlock the top frame means with the side frame means.

The lower end of the channel member 66 is also further defined by a relieved portion 71 on the outside surface of the outer side walls 67 and 67a of the channel member 66 is order to receive the loading flaps 40 and 41 in overlapping relation. Further, a bottom flange 72 extends inwardly to overlap lips 38 of the lower transverse member portions 31 and 32. These features produce at the lower right hand corner of the holder a light tight seal which is not likely to be broken if the film holder were accidentally dropped.

The details of the left side frame means 23 can be seen best in FIGURE 4. Similarly to the right side frame means 22 the left side frame means includes a left front guide rail 74 and a left rear guide rail 75 which are mounted together and to the septum 20 by means of a series of integrally formed bosses 76 on the guide rails 74 and 75 which extend through a series of apertures 77 in the septum 20. As can be seen, some of the bosses 76 are formed on the front guide rail 74 while some are formed on the rear guide rail 75. However, they are spaced so that they may be inserted through different apertures 77 and then cemented to the opposite guide rail. The left front guide rail 74 is formed substantially the same as the right rear guide rail 49 and the left rear guide rail 75 is the same as the right front guide rail 48. For this reason, the same numbers are used to identify the different portions, e.g. notch 62 on guide rail 74, and further detailed description is not felt to be necessary.

A left channel member 78 which is substantially the same as right channel member 66 is mounted around the guide rail portions 74 and 75 in the same manner that right channel member is mounted around guide rail portions 48 and 49. Left channel member 78 cooperates with the left end of the lower transverse member portions 31 and 32 and the loading flaps 40 and 41 to form a light tight seal at the lower left hand corner of the film holder in the same manner as channel 66 cooperates with those members to form a light tight seal at the lower right hand corner of the holder. Therefore, the same numbers are used to refer to the different positions of channel member 78 as channel member 66, and further description is not felt to be necessary.

Near the top of the septum 20 are located front and rear upper transverse members 80 and 81. These members 80 and 81 are mounted together and to the septum 20 by means of integrally formed bosses 82 which extend through a series of apertures 83 in the septum 20. These transverse members 80 and 81 receive the upper edge of the film 25 and hold it in position and consequently are formed with undercut portions along their lower edges, forming film receiving recesses 84. A tapered portion 85 is produced at the lower edge also in order that the film may be more easily inserted into the film receiving recesses 84. In order that the dark slides may be easily inserted over the upper transverse members, the top edge of the transverse members 80 and 81, such as 86 on portion 80, has been tapered.

At the top edge of the septum 20 is a light sealing means to prevent unwanted light from getting into the area where the film is held through the dark slide entry end of the film holder. In this embodiment, the light sealing means takes the form of a brass spring 87 covered by a soft black cloth 88. As can be seen, the spring 87 has the generally inverted V shape cross section. Also each of the sides of the spring 87 has a plurality of teeth extending from the connecting portion at the apex of the inverted V much like the teeth of a comb.

After the bottom and side frame means and the light sealing means have been placed on the septum assembly, the top frame means 24 is attached to the interlocking means. In the embodiments shown, the top frame means 24 includes three main members which are a front lock rib plate 89, a rear lock rib plate 90, and a center top rail 92 which is mounted between the lock rib plates. Members 89 and 90 are called lock rib plates because each is provided with a lock rib, such as 91 on plate 89 which is used to engage a portion of the camera (not shown) and thereby lock the film holder in the proper position in the camera.

The top frame means 24 is attached to the side frame means 22 and 23 in the following manner. Downwardly extending tabs 93 are located at the lower edge of the lock rib plates 89 and 90 and are inserted into the recesses 70 formed by the relieved portions at the upper ends of the channel members 66 and 78. Also provided on the lock rib plate 89 and 90 are a series of lugs 94 which extend inwardly from the outer sides of the lock rib plates respectively. The lugs 94 are spaced apart so that they will fit into the recess notches 61 and 62 on the locking portions 48a and 49a. With this structure, the lock rib plates 89 and 90 may be mounted to the side frame means by tilting the top of the front and rear lock rib plates 89 and 90 away from the respective septum faces so that the lugs 94 on these plates may pass in front of and to the rear of the outwardly facing recess notches 61 and 62, respectively. Then, the tabs 93 are inserted into the recesses formed by the relieved portions at the upper ends of the channel members 66 and 78 and the plates 89 and 90 are tilted to their upright position and attached to the top rail 92.

The particular manner in which the lock rib plates 89 and 90 are mounted to the top rail 92, may be best seen in FIGURE 4. A mortise forming lug 95 is formed on the inward side of the lock rib plates 89 and 90 at each of their ends. Located on the top rail 92 are a series of tenons 96 which are positioned to be inserted in the mortises 95. With this arrangement, the three members are not only held together by cement which is placed between the mortises 95 and the tenons 96, but there is actually a structural interlocking produced by the tenon-mortise joint which produces a rugged top frame means.

It should be noted that a spacer projection 97 is provided at either end of the lock rib plates 89 and 90. These spacer projections 97 are spaced apart slightly more than the width of the spring 87 in order to prevent it from moving transversely away from the center of the top frame means. It may also be seen in FIGURE 2, that the lock rib plates each have a transverse recess 98 extending across the opposed faces which partially receives the cloth covered spring 87 for a better light seal when slides 26 and 27 are not in place.

In FIGURE 1 it may be seen that the cloth covered spring 87 is enough wider than the dark slides 26 and 27 that the tooth at each end of each side of the spring is not compressed by the dark slide when the slide is inserted. Therefore, each of the upstanding portions 63 of the guide rails is situated between the septum 20 and an end tooth on the spring 87 to limit the extent that each end tooth may be compressed toward the septum. This is done to assure that a good light seal will be provided at the respective edges of the dark slides 26 and 27 when they are inserted into the film holder.

The broad idea of using a cloth covered inverted V-shaped spring to form a light seal in the slide entry end of a film holder is somewhat conventional, however, the particular manner in which the spring 87 is mounted in the film holder is believed to be novel and constitutes an improvement in the art. Heretofore, it has been the practice to mount the cloth covered spring rigidly upon a piece of wood or other material, completely filling the area inside the back or connecting portion of the spring. Where single springs were used, one for each face of the septum, they have been securely mounted to a center backing piece or the lock rib plates. With such rigid mountings, it is difficult to maintain the proper tension on the spring. If the pressure by the spring is too strong, the dark slide can be inserted or withdrawn only with difficulty. If the spring is too weak, it will not shut off all points whereby light could enter when the dark slide is withdrawn.

To overcome the above mentioned difficulties, I have designed the light sealing means so that it is restrained from moving from one general location by the upper edge of the septum 20 and the lower edge of the top rail 92 and the projections 97. However, the distance between the upper edge of the septum 20 and the lower edge of the top rail 92 is greater than the thickness of the spring 89 whereby the spring is not held rigidly, but rather it "floats" and may tilt forwardly and rearwardly. This freedom to tilt within the confined space permits both sides of the spring 87 to equalize themselves which makes it easier to provide the proper spring tension.

Having described my invention, the manner in which it is used will be described. The film 25 is loaded in the film holder very similarly to previous film holders which provide hinged loading flaps at the end of the film holder opposite the slide entry end. For example, the film 25 is loaded into the position on the front of the septum 20 by rotating the front hinged flap 40 to a generally downward position. At that time, the film is inserted into the film receiving recesses in the guide rail portions 48 and 74 and pushed upwardly until the upper edge enters the film receiving recess 84 in the upper transverse member portion 80. With the film 25 in this position, the lower edge of the film may be pushed into a position which is contiguous with the upper edge of the lower transverse member portion 31 and the loading flap 40 may be returned to its vertical position where the foot 45 holds the film securely. Then the loading operation is completed by inserting the dark slide 26 through the space between the lock rib plate 89 and the top rail 92 past the light seal 87 and along the dark slide recesses in the side frame means and into the dark slide recess 44 in the loading flap 40. As shown in FIGURE 2, the dark slide 26 holds the loading flap in the vertical closed position. The film is "loaded" on the rear side of the septum 20 in a similar manner.

Referring now to a second form which my invention may take, it may be seen in FIGURES 7 through 16 that the second embodiment differs only slightly from the first embodiment. The main difference between the two embodiments is that in the second embodiment the lower transverse member and the upper transverse member are directly molded to the septum plate rather than being formed in front and rear portions which are cemented together to form these members. Also, the interlocking means of the side frame means are directly molded to the septum while the guide portion of each of the side frame means is molded as one piece rather than being located in the septum plate and then cemented together.

Referring to FIGURE 7, the second embodiment incorporates a septum 120 which is preferably made of an aluminum sheet which is slightly larger than the size of the cut film and has a plurality of apertures therethrough. A top frame means, right and left side frame means, and a bottom frame means are mounted to the septum 120 to removably hold the film and dark slides as in the first embodiment of my invention. These frame means are very similar to those in the first embodiment, and therefore, only the portions which are different are shown.

The bottom frame means includes a lower transverse member, indicated generally by the arrow 121, which is molded as one piece to the septum 120. As in the first embodiment, the septum 120 is provided with a series of apertures 122 drilled through the lower edge thereof. Thereby the lower transverse member 121 is rigidly attached to the septum 120 by a series of integrally formed bosses 123 formed within the apertures 122 in the septum 120. As in the first embodiment of my invention, the septum 120 divides the lower transverse member 121 into a front lower transverse member portion 124 and a rear lower transverse member portion 125.

Forwardly and rearwardly projecting transverse ribs 126 and 127, respectively, are formed on the transverse member 121 for the same light obstructing purpose as the similar ribs on the transverse member portions 31 and 32 in the first embodiment. More specifically, loading flaps of substantially the same shape as loading flaps 40 and 41 (FIGURE 2) are hingedly mounted to the transverse member 121 by means substantially the same as the cloth hinge 42. The ribs 126 and 127 cooperate with the transverse rib receiving recesses (recess 43 on flaps 40 and 41) to form a positive light seal. As the hinged loading flaps and the cloth hinge have been described in detail in conjunction with the first embodiment, they will not be shown and described here.

The lower transverse member 121 differs from the lower transverse member in the first embodiment in that vertically extending forwardly and rearwardly projecting ribs 128 are provided in either end thereof. The ribs 128 are incorporated in order to provide a better light seal at the lower corner of the holder after the side frame means and loading flaps have been attached. Flanges 129 extend upwardly from each end of the lower transverse member portions 124 and 125, along the side edges of the septum, to provide a plastic surface to which the side frame means may be cemented.

Near the upper end of septum 120 is an upper transverse member 130, comprising front and rear upper transverse member portions 131 and 132, respectively, which is integrally mounted to the septum 120 by bosses 132a which extend through a series of apertures 133 in the septum 120. Similarly to the upper transverse member in the first embodiment, the upper and lower edges of the transverse member 130 have been tapered and recessed as shown in FIGURE 9. With this shape, film such as film 25 may be easily received by the lower edge and a dark slide such as 26 or 27 may be forced past the transverse member easily.

This embodiment of the invention uses lock rib plates and a top rail substantially the same as lock rib plates 89 and 90 and top rail 92. Therefore, as in the first embodiment, the second form of the invention, shown in FIGURE 7, has interlocking means 134 mounted adjacent to the left and right edge of the septum 120, respectively, by means of bosses 134a which extend through apertures 135 in the edge of the septum 120. Also similar to the first embodiment, front and rear locking portions 135a, which have outwardly facing recesses 136 formed therein to receive the tenon forming lugs 94 on the lock rib plates 89 and 90, are provided on the interlocking means.

I also provide an upstanding portion 138 that extends upwardly from each of the locking portions 135a. This is because I use a cloth covered spring in this embodiment, like spring 87, to provide a light seal at the dark slide entry ends of the film holder. Therefore, the portions 138 are used to limit the amount that the respective end teeth of the spring 87 may be compressed toward the septum when a dark slide is inserted past the inward teeth of the spring. Located below the recesses 136, respectively, is a downwardly extending mounting flange 139 which cooperates with the guide portion of the side frame means in a manner described below.

FIGURES 10 to 16 illustrate the details of a plastic side channel frame member 140 which may be used to form the guide portion of the side frame means in this embodiment. Only one side channel frame member is shown, since the channel member for both the left and right side are substantially identical. The side channel frame member 140 has a pair of outer vertically extending side walls 141 with a pair of vertically extending inner guide rails 142 held in generally parallel relation by a series of transversely extending spacer-guide portions 144. The spacer-guide portions perform the dual function of holding the guide rails 142 and the side walls 141 in parallel relation and providing a guide for the edges of a dark slide inserted between the rails 142 and walls 141. A recess 145 is formed on the inner surface of the upper end of the side walls 141 in order to receive the downwardly extending tab 93 on the lock rib plates 89 and 90, respectively, similarly to the first embodiment. Also similar to the first embodiment, a relieved portion 146 is formed on the outer surfaces of each of the side walls 141 at their respective lower ends in order to receive the loading flaps 40 and 41 in overlapping relation.

In order to more securely mount the side channel frame member 140 to the interlocking means 134, an upwardly extending locking tab 147 is located at the upper end of each of the inner guide rails 142. This tab 147 engages the locking portions 135a at the points opposite the respective outwardly facing recesses 136 and thereby positively prevents the side channel frame members from being moved outwardly even if the cement between the mounting flange 139 and the inner guide rail 142 were to become loose. Extending along approximately the middle two thirds of the inner guide rails 142 are spacer portions 148 which are separated a distance substantially equal to the thickness of the septum 120. With this arrangement, when the side frame channel member is mounted on the septum, a film receiving recess is formed between the guide rails 142 and the septum 120 which is equivalent to the first embodiment. As in the first described form of my invention, the guide rails 142 are tapered at portions 149 at the bottom of the film receiving recesses in order to allow the film to be inserted into the film receiving recess more easily. The inner guide rails 142 also have a reduced portion at the lower portion 151 just above a bottom plate 152 in order that the inner guide rails may fit around the end vertical ribs 128 when the slide channel frame member 140 is mounted to the septum 120, as shown in FIGURE 14.

FIGURES 13, 14, and 15 illustrate best that the outer edges of the flanges 129 and mounting flange 139 are located a small distance inward of the respective edges of the septum 120. Thereby, voids 153 are left after the channel member 140 has been mounted. The voids 153 receive any excess of the cement which is placed on the inner guide rails 142 at the proper locations opposite flanges 129 and portions 139 just prior to mounting the channel member 140.

It can be seen that the present invention provides a rugged and inexpensive film holder and further that both embodiments of the invention described illustrate the type of construction which produces these features. More specifically, each embodiment uses as a septum a single flat piece of relatively rigid material having apertures formed therethrough. The apertures receive bosses formed on plastic members which comprise part of the bottom and side frame means whereby these members may be integrally mounted to the septum within the perimeter of the edges of the septum. Then, other plastic members are attached to the integrally mounted plastic members and the septum to form means to removably hold a piece of photographic film against either side of the septum and to removably hold a dark slide over the film to protect the film from unwanted light. This structure enables the holder to be produced in an inexpensive manner.

It should be noted also that, as illustrated in the preferred embodiments, the present invention provides that the major portion, if not all, of each of the frame members is located within the perimeter of the edges of the septum. Further, the plastic members, which are integrally mounted, are attached to the other plastic members at portions located within the outline of the edges of the septum. With this arrangement, the septum may take any loads which tend to twist the frame members. Thereby, the present invention is able to produce a more rugged film holder of lighter weight than has been available prior to this time in addition to the fact that it is less expensive to produce.

Although only two embodiments of my invention have been shown here and described in detail, such is by way of illustration only and it will be apparent to those skilled in the art than numerous changes may be made without departing from the spirit of the invention. Therefore, it is my intention that the invention only should be limited to the scope of the following claims and not to the above described preferred embodiments thereof.

I claim:

1. A cut film holder comprising: a septum having front and rear sides, and bottom, side and top edges, said septum having apertures formed therethrough; a lower transverse member formed of front and rear transverse member portions attached together and to the septum by bosses extending through apertures in said septum at the lower end of said septum; an upper transverse member near the edge of said septum, said upper transverse member being formed of front and rear upper transverse member portions attached together and to the septum by means of bosses extending through apertures in said septum; interlocking means located adjacent either end of said upper transverse member near the respective side edges, each of said interlocking means including a front and rear locking portion which are attached together and to the septum by means of bosses extending through apertures in said septum; a guide portion rigidly mounted to a respective one of said interlocking means; and top frame means extending along the top edge of said septum, said top frame means having lugs which interlock with recesses in said interlocking means, said top frame means also having tabs which fit into relieved portions on said guide portions of said side frame means.

2. A film holder comprising a septum having front and rear faces, and bottom, side and top edges, said septum being formed with a plurality of apertures therethrough; a lower transverse member including cooperating elements located on opposite faces of said septum along the lower edge thereof and attached together and to said septum by means of bosses extending through cooperating apertures along said lower edge of the septum; an upper tranverse member including cooperating elements located on opposite faces of said septum and attached together and to said septum by means of bosses extending through apertures in said septum near the upper edge thereof; right and left side frame means mounted along the respective edges of said septum, said means having spaced rails thereon forming guides to removably hold film next to the septum faces and dark slides over the film; top frame means including front and rear lock rib plates and a top rail therebetween fixed together and forming between them two passages for dark slides to be inserted therethrough, said lock rib plates being attached to said side frame means; light-sealing means between said lock rib plates for preventing admission of light to any film in the holder when the dark slides are inserted and withdrawn, said sealing means including an inverted generally V-shaped spring and a cloth covering the spring, the apex of the upside-down V rockably positioned between the upper edge of the septum and the lower edge of the top rail, whereby the spring may tilt forward and backward.

3. A film holder comprising: a septum having front and rear sides, and bottom, side and top edges, said septum having apertures formed therethrough; and bottom, right side, left side, and top frame means mounted around the respective edges of said septum and forming a continuous frame on either side of the septum to removably hold a piece of film against the septum and a dark slide, said bottom assembly including a lower transverse member formed of front and rear transverse member portions mounted together and to the septum by bosses extending through apertures in said septum at the lower end of the septum, each of said side frame means including interlocking means which has front and rear locking portions which are attached together and to the septum by bosses extending through apertures in said septum, the left and right outside edges of said lower transverse member and interlocking means respectively being located a small distance inward from the left and right edges of said septum, said side frame means being mounted to the respective interlocking means and the ends of the lower transverse member at portions which are within the vertical and transverse dimensions of said septum, said top frame means being mounted to said interlocking means at portions which are within the vertical and transverse dimensions of said septum.

4. A film holder comprising a septum having front and rear faces, and bottom, side and top edges, said septum being formed with a plurality of apertures therethrough; a lower transverse member mounted along the lower edge of said septum by extending through apertures along said lower edge; an upper transverse member mounted to said septum by extending through apertures in said septum, said upper and lower transverse members each being of slightly less width than is said septum; right and left side frame means mounted along the respective edges of said septum, said means being attached to said lower transverse member at portions within the perimeter of the edges of said septum, said means having spaced rails thereon forming guides to removably hold film next to the septum faces and dark slides over the film; a top frame means including front and rear lock rib plates and a top rail therebetween fixed together and forming two passages between them for dark slides, said lock rib plates being mounted between said side frame means at points within the perimeter of the edges of the septum; and light-sealing means between said lock rib plates for preventing admission of light to any film in the holder when the dark slides are inserted and withdrawn.

5. A film holder comprising: a septum having front and rear faces, and bottom, side and top edges, said septum being formed with a plurality of apertures therethrough; a lower transverse member mounted along the lower edge of said septum by extending through apertures adjacent said lower edge, said transverse member having a front and rear upwardly extending flange abutting the front and rear faces of said septum; an upper transverse member attached to said septum by means of bosses extending through apertures in said septum, said upper and lower transverse members each stopping short of the adjacent side edge of said septum; right and left side frame means extending between said lower and upper transverse members along the respective edges of the septum, each of said side frame means including a generally channel-shaped member having two outer side walls extending inside the perimeter of the edges of the septum from the web of the channel member to engage the edge of the outer faces of the dark slides, each of said side frame means having a vertically extending guide rail intermediate each outer side wall and the adjacent faces of said septum to provide grooves for receiving a piece of film and a dark slide spaced from and covering said film; a top frame means including a front lock rib plate, a rear lock rib plate, and a top rail mounted therebetween, said lock rib plates being mounted to said septum by the side frame means; dark slides movable across said septum to cover any film therein and protect it from light; and light-sealing means located between said lock rib plates for preventing admission of light to said film when said slides are inserted and withdrawn.

6. A film holder comprising: a septum having front and rear sides, and bottom, side and top edges, said septum having apertures former therethrough; and bottom right side, left side, and top frame means, mounted along the respective edges of said septum and forming a continuous frame on either side of said septum to hold a piece of film against the septum, and a dark slide, said bottom frame means including a lower transverse member comprising front and rear lower transverse member portions joined together by a series of integrally formed bosses extending through apertures in said septum adjacent said bottom edge, each of said side frame means having interlocking means located near its upper end and a guide portion extending from the interlocking means downwardly toward the bottom edge of the septum, each of said guide portions including front and rear guide rails on opposite sides of the septum and a generally channel-shaped member having side walls extending inward from a web, said guide rails and channel member forming means to removably hold any film in place against the septum and guide dark slides over the film, said guide rails each having integrally formed bosses extending through apertures in said septum and attached to the guide rail opposed thereto, the outer edge of each of the guide rails nearest the respective edge of the septum being recessed to form an outer flange which terminates in an outer edge which is displaced slightly inward of the respective edge of the septum, the opposed surfaces of the side walls of the channel member engaging the respective faces of the outer flanges which face away from the septum, said channel member having front and rear inner ribs fitting between and engaging the respective guide rails' outer flanges in the septum, the web of the channel member being spaced from the outer edge of each of the respective outer flanges forming voids.

7. A film holder comprising: a single-piece septum having front and rear sides, and bottom, side and top edges, said septum being formed with a plurality of apertures therethrough; a lower transverse member comprising front and rear lower transverse member portions joined together by a series of integrally formed bosses extending through apertures in said septum along said bottom edge; front and rear loading flaps hingedly mounted to said lower transverse member, each of said loading flaps having a transversely extending dark slide-receiving racess facing upwardly when the flaps are closed; an upper transverse member comprising front and rear upper transverse member portions joined together by integrally formed bosses extending through bores in said septum, said lower and upper transverse members being slightly shorter than the width of the septum; right and left side frame means extending along the respective sides of said septum, each of said side frame means having interlocking means located at the upper end of the respective side frame means and a guide portion extending from the locking means downwardly toward the bottom edge of the septum, said interlocking means including front and rear locking portions attached together and to the septum by means of integrally formed bosses extending through apertures in said septum, said guide portion including front and rear guide rails on opposite sides of the septum and a generally channel-shaped member having side walls extending inwardly from a web, said guide rails and channel member forming means to removably hold film against the septum and guide the dark slides over the film, said guide rails each having integrally formed bosses extending through apertures in said septum and attached to the other of the guide rails, an outer flange on the outer edge of each of the guide rails, each of said outer flanges being spaced from the septum, each of said outer flanges terminating in an outer edge which is displaced slightly inward of the respective edge of the septum, the opposed surfaces of the side walls of the channel member engaging the respective faces of the outer flanges which face away from the septum, said channel member having front and rear inner ribs fitting between and engaging the respective guide rails' outer flanges and the septum, the web of said channel member being spaced from the outer edge of each of the respective outer flanges forming voids; a top frame means including a front and a rear lock rib plate attached to a top rail located therebetween, each of said lock rib plates having a lug at either end thereof interlocking with a recess in a different one of said locking portions respectively, each of said lock rib plates having at either end thereof a downwardly extending tab engaging the inner surface of a respective side wall of the channel members; and light-sealing means located within the top frame means to prevent the admission of light when dark sildes are inserted and withdrawn from the holder.

8. A film holder comprising: a single-piece septum having front and rear faces, and bottom, side and top edges, said septum being formed with a plurality of apertures therethrough; a lower transverse member comprising front and rear lower transverse member portions joined together by a series of integrally formed pin portions extending through apertures in said septum adjacent said bottom edge; right and left side frame means extending along the respective sides of said septum, each of said side frame means having interlocking means located at the upper end of the respective side frame means and a guide portion extending from the interlocking means downwardly toward the bottom edge of the septum, each of said interlocking means including front and rear locking portions mounted together and to the septum by means of integrally formed pin portions extending through apertures in said septum, said guide portion including juxtarelated front and rear guide rails and a generally channel-shaped member having side walls extending inwardly from a web, said guide rails and channel member means to hold a piece of film in place on either face of the septum and guide dark slides over the film, said guide rails each having integrally formed pin portions extending through apertures in said septum and attached to the other of the guide rails, the outer edge of each of the guide rails which is adjacent a respective side edge of the septum being recessed forming an outer flange, said outer flange terminating in an outer edge which is displaced slightly inward of the respective edge of the septum, the opposed surfaces of the side walls of the channel member engaging the respective faces of the outer flanges which face away from the septum, said channel member having front and rear inner ribs fitting between and engaging the respective guide rails' outer flanges and the septum, the web of said channel member being spaced from the outer edge of each of the respective outer flanges to form voids; a top frame means including a front and a rear lock rib plate attached to a top rail located therebetween, each of said lock rib plates having a lug at either end thereof interlocking with a recess in a different one of said locking portions respectively, each of said lock rib plates having at either end thereof a downwardly extending tab engaging the inner surface of a respective side wall of the channel members; and light-sealing means located within the top assembly to prevent the admission of light when dark slides are inserted and withdrawn from the holder.

9. A film holder comprising: a septum having front and rear sides, and bottom, side and top edges, said septum having apertures formed therethrough; and bottom, right side, left side, and top frame means located along the respective edges of said septum and forming a continuous frame on either side of said septum to hold a piece of film against the septum, and a dark slide, each of said side frame means including interlocking means having front and rear locking portions mounted together and to the septum by bosses extending through apertures in said septum, each of said side frame means having a guide portion including a channel member having two side walls extending inwardly from the web in opposed relation to the faces of the septum, said channel member having front and rear guide rails engaging the respective front and rear faces of the septum, each of said guide rails having an upwardly extending tab at the upper end thereof engaging an inward edge of the front and rear locking portions respectively, said bottom frame means including a lower transverse member terminating a small distance inward of the respective side edges of the septum, each of said channel members being mounted to a corresponding side of said lower transverse member at a portion inward of the edges of the septum.

10. A film holder comprising: a septum having front and rear sides, and bottom, side and top edges, said septum having apertures formed therethrough; and bottom, right side, left side, and top frame means mounted along the respective edges of said septum forming with said septum a continuous frame on either side of said septum to hold a piece of film, and a dark slide, each of said side frame means including interlocking means having front and rear locking portions attached together and to the septum by integrally formed bosses extending through apertures in said septum, the outside edge of each interlocking portion being a small distance inside the respective edge of the septum, each of said side frame means having a guide portion including a channel member having two side walls extending inwardly from the web in opposed relation to the spaces of the septum and front and rear guide rails engaging the respective front and rear faces of the septum, each of said guide rails having an upwardly extending tab at the upper end thereof engaging the inward edge of the front and rear locking portions respectively, said bottom frame means including a lower transverse member formed of front and lower rear transverse member portions mounted together and to the septum by a series of integrally formed bosses extending through apertures in the septum, said lower transverse member terminating a small distance inside the respective side edges of the septum, said front and rear lower transverse member portions each having a transversely extending projecting rib, a projecting rib extending upwardly from each end of each of the respective transverse ribs, each of said guide rails being recessed at its lower end and abutting the upper and outside edges of the respective vertical rib on the lower transverse member portions, each of said channel members being mounted to the respective side of said lower transverse member at a portion within the perimeter of the septum.

11. A film holder comprising: a septum having front and rear sides, and bottom, side and top edges, said septum having bores formed therethrough; and bottom, right side, left side, and top frame means mounted along the respective edges of said septum forming with said septum a continuous frame on either side of said septum to hold a piece of film, and a dark slide, each of said side frame means including interlocking means having front and rear locking portions mounted together and to the septum by integrally formed pin portions extending through bores in said septum, the outside edge of each interlocking portion being a small distance inside its respective edge of the septum, each of said side frame means having a guide portion including a channel member having two side walls extending inwardly from the web in opposed relation to the spaces of the septum and front and rear guide rails engaging the respective front and rear faces of the septum, a plurality of transversely extending spacer-guide portions spacing the front and rear guide rails from their respective juxtarelated side walls, each of said guide rails having an upwardly extending tab at the upper end thereof engaging the inward edge of the front and rear locking portions respectively, said bottom frame means including a lower transverse member formed of front and rear lower transverse member portions mounted together and to the seputm by a series of integrally formed pin portions extending through bores in the septum, said lower transverse member terminating a small distance inside the respective side edges of the septum, said front and rear lower transverse member portions each having a transveresly extending projecting rib and a projecting rib extending upwardly from either end of each of the respective transverse ribs, said bottom frame means including front and rear loading flaps extending transversely across the bottom edge of the septum and being hingedly mounted at their respective lower edges to said lower transverse member, said front and rear loading flaps engaging the faces of the respective vertical ribs on the lower transverse member portions which face away from the septum, each of said guide rails being recessed at its lower end and abutting the upper and outside edges of the respective vertical rib on the lower transverse member portions.

12. A film holder as defined in claim 11 wherein said top frame means includes front and rear lock rib plates and a top rail therebetween fixed together and forming two passages therethrough for dark slides, and a light-sealing means is located between said front and rear lock rib plates for preventing the admission of light to film in the holder when the dark slides are inserted and withdrawn, said sealing means including an inverted generally V-shaped spring and an opaque resilient material covering the spring, the apex of the inverted V being located between the upper edge of the septum and the lower edge of the top rail, the distance between the upper and lower edges of the septum and top rail respectively being greater than the thickness of the spring, whereby the spring may tilt forwardly and rearwardly.

References Cited in the file of this patent

UNITED STATES PATENTS

| 766,869 | Borsum | Aug. 9, 1904 |
| 2,326,075 | Smith | Aug. 3, 1943 |
| 2,433,613 | Little | Dec. 30, 1947 |
| 2,497,270 | Panosian | Feb. 14, 1950 |
| 2,539,342 | Bleitz | Jan. 23, 1951 |
| 2,676,901 | Panosian | Apr. 27, 1954 |